United States Patent [19]

Kato

[11] 4,282,779

[45] Aug. 11, 1981

[54] INDEXING DRIVE APPARATUS

[75] Inventor: Heizaburo Kato, Tokyo, Japan

[73] Assignee: Sankyo Manufacturing Company, Ltd., Tokyo, Japan

[21] Appl. No.: 87,836

[22] Filed: Oct. 24, 1979

[30] Foreign Application Priority Data

Oct. 26, 1978 [JP] Japan .................................. 53/131942
Mar. 9, 1979 [JP] Japan .................................. 54/27386

[51] Int. Cl.³ .......................................... B23Q 17/00
[52] U.S. Cl. ..................................... 74/822; 74/827; 74/125.5
[58] Field of Search ................. 74/813 R, 813 C, 815, 74/816, 817, 827, 824, 822, 125.5

[56] References Cited

U.S. PATENT DOCUMENTS

| 551,171 | 12/1895 | Ritter | 74/817 |
| 975,659 | 11/1910 | Uebel/messer | 74/125.5 |
| 3,598,000 | 8/1971 | Meissner | 74/827 |

FOREIGN PATENT DOCUMENTS 53-43284  4/1978  Japan .

Primary Examiner—Kenneth Dorner

Attorney, Agent, or Firm—Pollock, Vande Sande & Priddy

[57] ABSTRACT

An indexing drive apparatus comprises a cam assembly connected to a drive source, a cam follower turret adapted to follow the rotation of the cam assembly to be swung, a turret shaft having the turret assembly fixedly mounted thereon and adapted to be rotated in an oscilatory manner in correspondence to the swinging movement of the turret, an output shaft extending in parallel with the turret, and interlocking unit for operatively connecting the turret shaft and the output shaft. The interlocking unit includes a first swing arm secured to the turret shaft, a slide member supported in the first arm slidably in the axial direction thereof, a second swing arm secured to the output shaft, a connecting member pivotally connecting the slide member to the second swing arm, and adjusting means provided in association with the slide member for varying the ratio of a swing angle of the second swing member to that of the first swing arm by adjusting the position of the slide member relative to the first arm. The output shaft is constituted by two shaft halves which are disconnectably coupled to each other by means of a one-way clutch.

10 Claims, 21 Drawing Figures

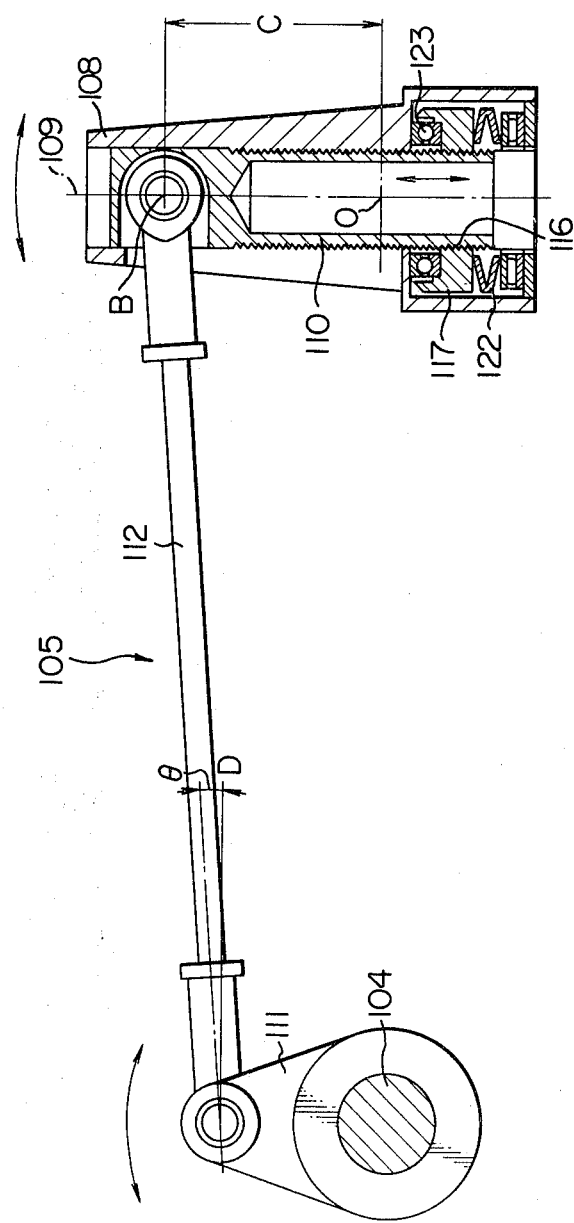

INDEXING DRIVE APPARATUS

BACKGROUND OF THE INVENTION

1. Field of the Invention

The present invention relates to an indexing apparatus which is adapted to convert a continuously rotating input power available from a conventional prime mover such as an electric motor or the like into an intermittent rotation or an oscillating or swinging output power. Such drive apparatus is suited for intermittently rotating or indexing turntables incorporated in automatic manufacturing machines or other machine tools. Further, the drive apparatus can be advantageously used for feeding intermittently an elongated strip-like blank material to work stations on a step-by-step base. The drive apparatus of this type is generally referred to as the indexing drive apparatus.

2. Description of the Prior Art

In general, a hitherto known indexing drive apparatus comprises an input shaft which is driven continuously by a drive source in a predetermined direction. The continuous rotation of the input shaft is converted into an intermittent rotation or an oscillatory rotation through cooperation of a cam mounted on the input shaft and a cam follower or alternatively through cooperation of a one-way clutch and a brake and transmitted to an output shaft through a gear train. The indexing drive apparatus of this type usually suffers from a serious problem in that the rotation angle or magnitude of the intermittent rotation of the output shaft can not be changed without replacing gears constituting the gear train or the like transmitting elements. Consequently, troublesome procedure is required for the replacement of the gears to a great disadvantage. Further, a frequent change required in the pitch of the intermittent rotation involves a great loss in the overall operation efficiency.

As an attempt to overcome the above difficulty particularly in the field of a sheet material feeding roller apparatus, there has been proposed an arrangement in which an elongated arm integrally combined with the cam follower member is operatively coupled to the output shaft through a connecting rod. A slidable member is mounted on the arm so as to be movable in the axial direction of the arm and one end of the connecting rod is pivotally connected to the slidable member. For example, reference is to be made to Japanese Laid-Open Patent Publication No. 43284/1978. With this arrangement, it is certainly possible to change the magnitude of the intermittent rotation or swing movement of the output shaft by varying the position of the slidable member relative to the arm without requiring replacement of the transmitting elements such as gears. However, the prior art drive apparatus is also disadvantageous in that the adjustment can not be effected without interrupting the operation of the drive apparatus as well as the machines as driven. Additionally, backlash is likely to occur in operation and thus the drive apparatus is not suited for a high speed operation. Further, the prior art driving apparatus can not assure an indexing operation with a high accuracy.

SUMMARY OF THE INVENTION

Accordingly, an object of the invention is to provide an indexing drive apparatus which is evaded from the shortcomings of the hitherto known apparatus such as described above and allows adjustment of a stroke of pitch of the intermittent rotation or swing output to be made in a stepless manner without need for interrupting the operation of the apparatus, or replacement of transmitting elements.

Another object of the present invention is to provide an indexing drive apparatus which is substantially insusceptible to backlash in operation and thus can be operated at a high operation speed.

Still another object of the present invention is to provide an indexing drive apparatus which can assure an improved indexing accuracy.

In view of the above objects, there is proposed according to a general aspect of the present invention an indexing drive apparatus comprising a composite cam assembly connected to a drive source to be rotated, a turret assembly adapted to follow rotation of the composite cam assembly thereby to be swung, a turret shaft having the turret assembly fixedly mounted thereon and adapted to be rotated in an oscillatory manner in correspondence to the swinging movement of the turret assembly, an output shaft extending substantially in parallel with the turret shaft, and an interlocking unit for operatively connecting the turret shaft and the output shaft to each other, the interlocking unit including a first swing member fixedly secured to the turret shaft at one end thereof, a movable member mounted on the first swing member to be swung together with the first swing member and adapted to be movable relative to the first swing member in the axial direction thereof, a second swing member fixedly secured to the output shaft at one end thereof, a connecting member for linking the other end of the second swing member to the movable member, and adjusting means operatively connected to the movable member for varying ratio of a swing angle of the second swing member to a swing angle of the first swing member by adjusting position of the movable member relative to the first swing member in the axial direction thereof.

The above and other objects, novel features as well as advantages of the present invention will become more apparent from the description of the preferred embodiments of the invention taken in conjunction with the accompanying drawings.

BRIEF DESCRIPTION OF THE DRAWINGS

FIG. 12 illustrates a structure of an interlocking unit employed in the apparatus shown in FIG. 10.

DETAILED DESCRIPTION OF THE PREFERRED EMBODIMENTS

Figure 1:
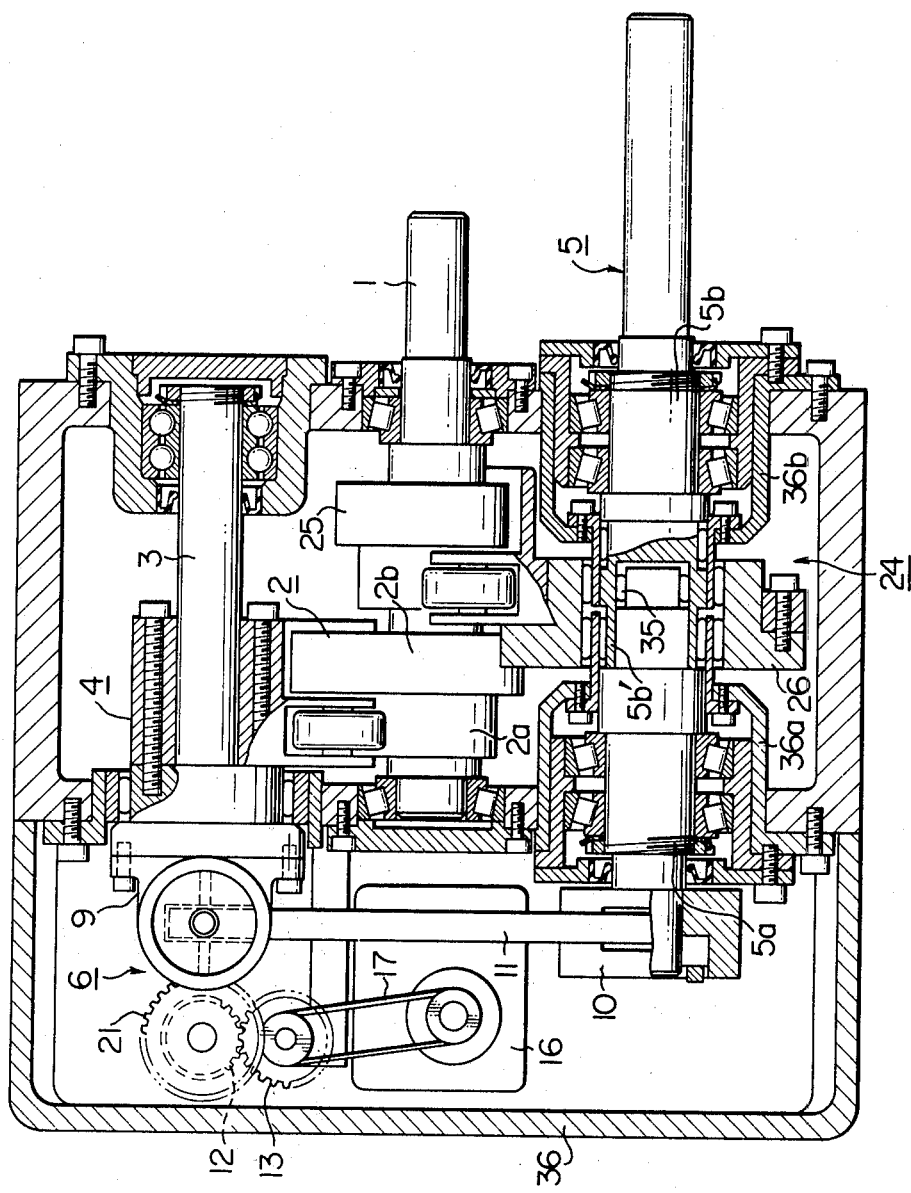
FIG. 1 is a longitudinal sectional view showing a general arrangement of an indexing drive apparatus according to an embodiment of the present invention.

Now, the invention will be described in conjunction with exemplary embodiments of the indexing drive apparatus adapted to produce an intermittently rotating drive power or swinging drive power (oscillatory rotation output) in a variable manner according to the teaching of the invention.

Referring first to FIGS. 1 to 9, the indexing drive gear apparatus according to a first embodiment of the invention includes an input power shaft 1 which is coupled to a suitable drive source or prime mover (not shown). A cam assembly 2 is fixedly mounted on the input shaft 1 to be rotatable together with it. Extending in parallel with the input shaft 1 is a turret shaft 3 on which a cam follower turret assembly 4 of an inverted V-like configuration is fixedly mounted in a vertical alignment with the cam assembly 2 so as to be moved swingably under the camming action of the latter. The cam follower assembly 4 will be hereinafter referred to as the turret assembly. An output shaft assembly 5 is disposed substantially in parallel to the turret shaft 3 and operatively connected to the latter through an interlocking unit generally denoted by reference numeral 6. By the way, the cam assembly 2 and the turret assembly 4 will be referred to as the first cam assembly and the first turret assembly, respectively, in order to discriminate them from other cam assembly 25 and turret assembly 26 which will be described hereinafter and referred to as the second cam assembly and the second turret assembly, respectively.

Figure 2:
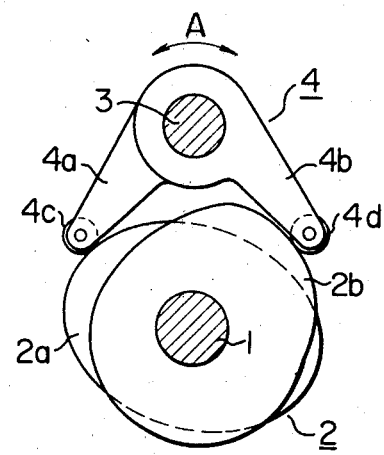
FIG. 2 illustrates a positional relationship between a first cam assembly and a first cam follower turret incorporated in the indexing drive apparatus shown in FIG. 1.

Referring to FIGS. 1 and 2, the first turret assembly 4 is in an inverted V-like form and has a pair of legs 4a and 4b which are provided with cam follower rolls 4c and 4d at respective lower or free ends thereof. On the other hand, the cam assembly 2 is constituted by pair of cam discs 2a and 2b. It will be noted that the turret assembly 4 and the cam assembly 2 are so disposed relative to each other that the cam follower rolls 4c rests on the peripheral camming surface of the cam disc 2a while the cam follower roll 4d follows the rotation of the cam disc 2b. In this manner, when the cam assembly 2 is rotated continuously in one direction together with the input shaft 1, the first turret assembly 4 is caused to move swingably with the shaft 3 being rotated in an oscillating manner as indicated by an arrow A in FIG. 2. The swinging movement of the first turret assembly 4 will of course depend on the geometrical configuration or profile of the cam discs 2a and 2b. It should be mentioned here that the mechanism for converting a rotating movement into a swinging movement or oscillatory rotation with the aid of a combination of a cam and a turret assembly of the type described above has been hitherto known by itself as referred to sometimes as the swinging drive unit. Further, the arrangement such that the cam follower rolls disposed rotatably at the free ends of the bifurcated legs of the inverted V-like member are brought in engagement with the associated cam members which are adapted to be rotated together as an integral unit has also been known in terms of the conjugated cam mechanism. In the case of the illustrated embodiment now being described, by virtue of the adopting of the so-called conjugated cam mechanism, undesirable back-lash can be positively prevented from occurrence by maintaining the cam discs 2a;2b and the cam follower rolls 4c;4d in the mutually engaged state under a preset pressure which can be controllably established by decreasing the distance between the input shaft 1 and the turret shaft 3, whereby vibrations and generation of noises in the operation of the indexing drive apparatus can be effectively suppressed even at a high operation speed. Additionally, a high indexing accuracy can be attained in the operation of the indexing drive apparatus.

Figure 4:
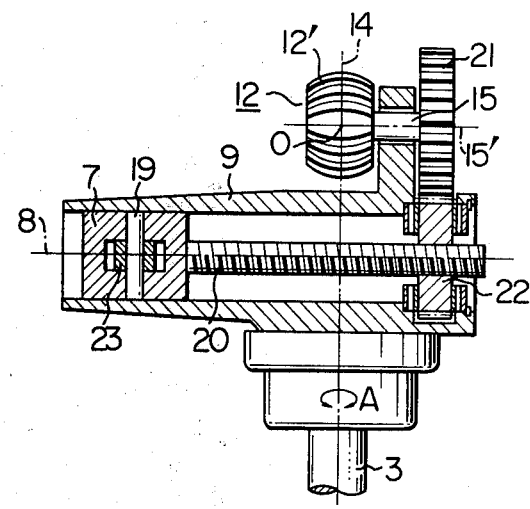
FIG. 4 shows the same in a sectional view taken along the line IV—IV in FIG. 3.
Figure 3:
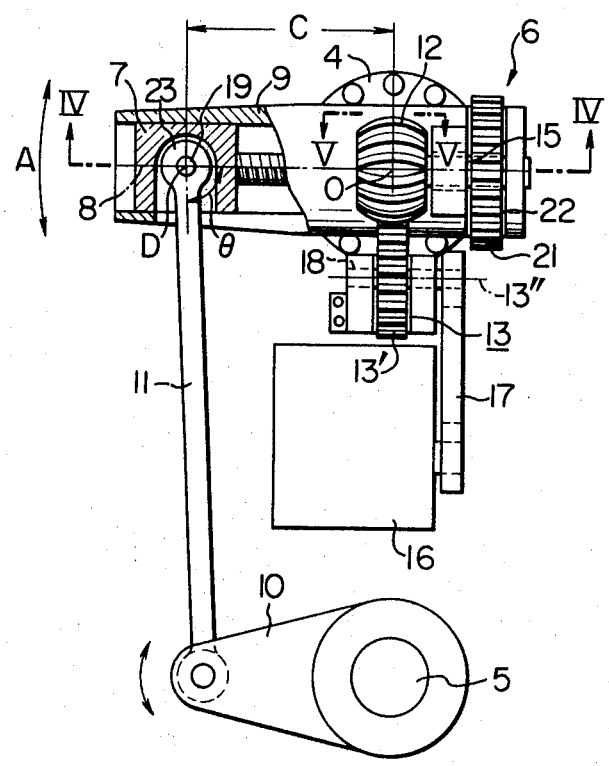
FIG. 3 is a side view showing a structure of an interlocking unit incorporated in the indexing drive apparatus.
Figure 5A:
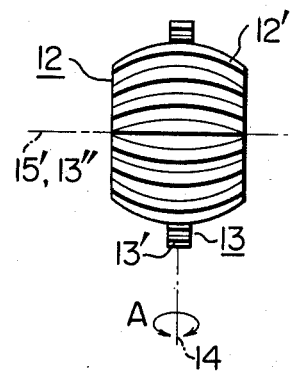
FIG. 5a shows an arrangement of a crown gear and a spur gear as viewed in the direction indicated by an arrow-headed line V—V in FIG. 3.
Figure 5B:
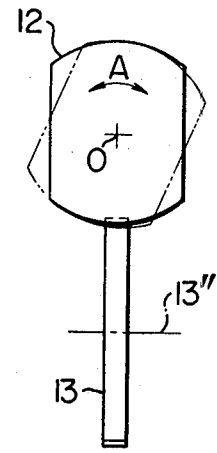
FIG. 5b is to illustrate a swinging movement of the crown gear relative to the spur gear.

Referring to FIGS. 3 and 4 in combination with FIG. 1, the interlocking or coupling unit 6 includes a first swingable arm 9 which extends in a direction substantially orthogonal to the axis of the turret shaft 3 (FIG. 4) and has one end connected fixedly or integrally to the turret shaft 3. A slide member 7 is disposed longitudinally slidably in the swing arm 9 for the purpose described hereinafter. The interlocking unit 6 further comprises a second swing arm 10 extending in parallel with the first swing arm 9 and fixedly fitted on the output shaft assembly 5 at an inner end thereof, a connecting rod 11 pivotally connected to a free end of the second swing arm 10 and to the slider member 7, a spherical or crown gear 12 provided at the first swing arm 9, and a spur gear 13 mounted rotatably at a stationary portion of a housing 36 and adapted to mesh with the crown gear 12 (refer to FIG. 1). It should be noted that the spherical gear or crown gear 12 is so mounted as to be swingable about the axis 14 of the turret shaft 3 (FIG. 4) together with the first swing arm 9 as indicated by an arrow A in FIGS. 4 and 5a and additionally rotatable about the axis 15' extending orthogonally to the axis 14 in a plane containing the axis 14 of the turret shaft 3 and the axis 8 of the first swingable arm 9. The crown gear 12 has a semi-spherical surface having the center of curvature at the intersection O of the turret axis 14 and the rotation axis 15' and formed with a number of external gear teeth 12' which extend arcuately along the direction of the rotation axis 15'. The crown gear 12 is meshed with the spur gear 13 which has gear teeth 13' extending linearly in the same direction as the arcuate teeth 12' of the crown gear 12 (refer to FIG. 5a in particular). With such arrangement of the crown gear 12 and the spur gear 13, swinging of the crown gear 12 about the turret axis 14 in a horizontal direction as indicated by the arrow A as viewed in FIG. 4 will bring about a corresponding movement of the teeth 12' relative to the teeth 13' of the spur gear 13 in the same direction as the swinging of the crown gear 12 about the axis 14. Reference is made to a phantom line position in FIG. 5A. On the other hand, when the spur gear 13 is rotated about the center axis 13'' thereof (FIGS. 3 and 5), the crown gear 12 is caused to rotate about the axis 15'. In FIGS. 1 and 3, reference numeral 16 denotes an electric motor for driving the spur gear 13 through a drive belt 17 running around a pulley of the shaft 18 on which the spur gear 13 is fixedly mounted.

Referring to FIGS. 3 and 4, a driving gear 21 is fixedly mounted on the rotatable shaft 15 of the crown gear 12 and meshes with a driven gear 22 which in turn is threadedly mounted on a threaded rod 20 disposed in a guide groove formed in the swing arm 9 for the slider member 7. It will be noted that the gear 22 is supported stationarily relative to the arm 9. The free end of the threaded shaft 20 is fixedly connected to the slider 7. With this arrangement, when the motor 16 is operated to drive the spur gear 13 thereby to rotate the crown gear 12 about the rotation axis 15 thereof, the driven gear 22 is rotated by the driving gear 21, whereby the threaded shaft 20 and hence the slider member 7 are displaced in a corresponding direction along the axis 8. The purpose of providing the slider member 7 in the manner described above is to allow an angular swing range of the second arm 10 to be varied relative to that of the first swing arm 9, as will be elucidated hereinafter. In FIGS. 3 and 4, reference numeral 19 denotes a pivot pin secured to the slider member 7 and serving for pivotally connecting an enlarged end portion 23 of the connecting rod 11 to the slider member 7. The other end of the connecting rod 11 is also pivotally connected to the second swingable arm 10 in a similar manner (refer to FIG. 3).

Figure 6:
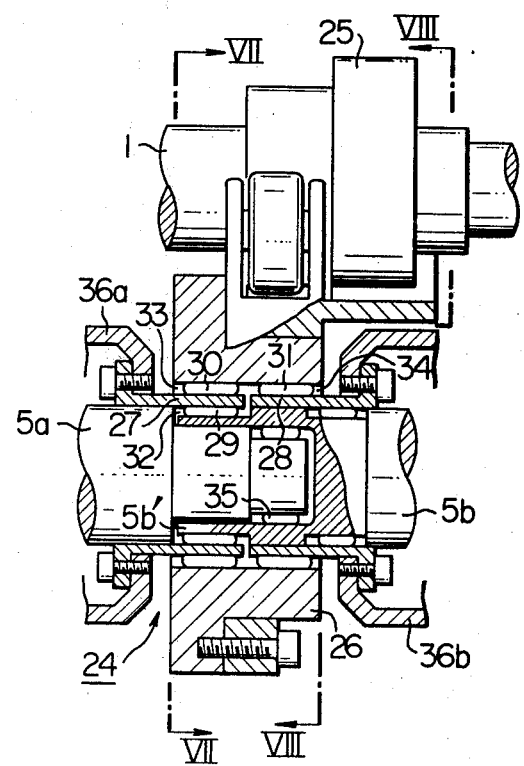
FIG. 6 is a fragmental enlarged view of FIG. 1 showing a structure of a clutch incorporated in the indexing drive apparatus.
Figure 7:
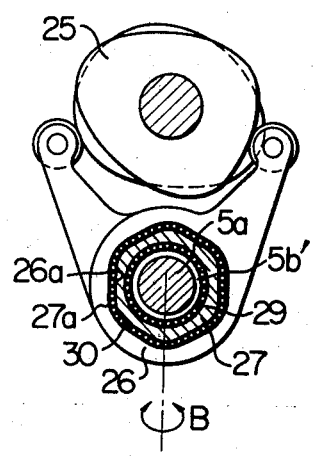
FIG. 7 is a sectional view taken along the line VII—VII in FIG. 6 and viewed in the direction indicated by attached arrows.
Figure 8:
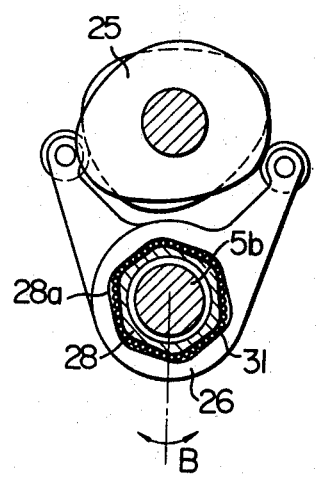
FIG. 8 is a sectional view taken along the line VIII—VIII in FIG. 6 and viewed in the direction indicated by attached arrows.

Next, reference is made to FIGS. 6 to 8 in combination with FIG. 1. The output shaft assembly 5 is essentially composed of a first shaft half 5a and a second shaft half 5b. The second swing arm 10 described above is fixedly secured to the right end of the first shaft half 5a as viewed in FIG. 1, while the other (or left) end portion of the first shaft half 5a is reduced in diameter and rotatably lodged within a sleeve portion 5b' formed integrally in the opposite right end portion of the second shaft half 5b. The output shaft halves 5a and 5b are adapted to be disengageably coupled to each other through a clutch unit designated generally by reference numeral 24. The clutch unit 24 comprises a second cam assembly 25 fixedly secured to or formed integrally with the input shaft 1 (FIGS. 1 and 6) and a second turret assembly 26 which is disposed so as to enclose the sleeve portion 5b' at the coupling location of the output shaft halves 5a and 5b. There are provided between the sleeve portion 5b' and the second turret assembly 26 a clutch sleeve 27, a brake sleeve 28 and first to third groups of needle rollers 29 to 31 which are arranged in the manner shown in FIG. 6. The configurations and structures of the second cam assembly 25 and the second turret assembly 26 may be similar to those of the first cam assembly 2 and the first turret assembly 4.

More particularly, referring to FIGS. 1 and 6, the clutch sleeve 27 is inserted between the sleeve portion 5b' and an inner peripheral wall 26a of the mounting hole formed in the second turret assembly 26 to thereby define first and second annular gaps 32 and 33 between the sleeve portion 5b' and the second turret assembly 26, while the brake sleeve 28 is fitted around the end portion of the second shaft half 5b adjacent to the clutch sleeve 27 to define a third annular gap 34 in cooperation with the inner peripheral wall 26a of the mounting hole of the second turret assembly 26. The clutch sleeve 27 is fixedly secured to a shaft enclosure wall portion 36a of the housing 36 at the left end thereof by means of screws, while the brake sleeve 28 is fixedly secured to a similar enclosure wall portion 36b at the right end thereof as viewed in FIGS. 1 and 6. As can be best seen from FIGS. 7 and 8, the first to third groups of needle rollers 29, 30 and 31 described above are accommodated within the first, second and the third annular gaps 29, 30 and 31, respectively, with the individual needle rollers being arrayed closely to one another in each of the annular gaps.

The inner peripheral wall 26a of the mounting hole formed in the second turret assembly 26 as well as the outer peripheral surface of the clutch sleeve 27 are each shaped in the form of a substantially similar equilateral polygon in cross-section (hexagonal shape in the case of the illustrated embodiment), wherein each side of the polygon is profiled in a form of Archimedes' spiral, as can be seen from FIG. 7. It is assumed now that the second turret assembly 26 is rotated for a predetermined angle from the position at which the inner wall 26a of the second turret assembly 26 is aligned with the outer periphery 27a of the clutch sleeve 27 in respect of the cross-sectional configuration (i.e. the position shown in FIG. 7) to the position shown in FIG. 7a in which the cross-sectional profiles in concern are mutually deviated in the peripheral direction from the aligned position. In this state shown in FIG. 7a, the inner peripheral wall 26a of the second turret assembly 26 will press the second group of needle rollers 30 against the clutch sleeve 27 which will then be pressed radially inwardly. As the consequence, the sleeve portion 5b' of the second output shaft half 5b is additionally pressed radially inwardly against the outer peripheral surface of the first output shaft half 5a through the first group of the needle rollers 29. In this manner, the first output shaft half 5a is brought into a tight frictional engagement with the second shaft half 5b at the location of the sleeve 5b', whereby the first and the second shaft halves 5a and 5b are in the position to be rotated together as the unitary combined output shaft 5. On the other hand, when the second turret assembly 26 is rotated in the opposite direction indicated by an arrow B in FIG. 7 for the predetermined angle, the aligned position between the second turret assembly 26 and the clutch sleeve 27 is restored, wherein the first output shaft half 5a is idly rotatable within the sleeve portion 5b' of the second output shaft half 5b. Thus, drive power transmission from the first to the second output shaft half will not take place.

Figure 9:
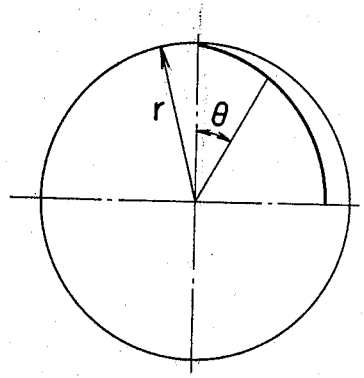
FIG. 9 is to illustrate an Archimedes' spiral in accordance with which clutch elements can be profiled.

With the terms "Archimedes' spiral" recited above, it is intended to mean a curve of which radius r varies at a constant rate as a function of a rotational angle $\theta$, i.e. the curve which can be mathematically expressed by $r = K\theta$ where K is a constant, as is illustrated in FIG. 9. Although it has been found that both the inner wall of the cam opening mounting hole formed in the second turret assembly 26 and the outer periphery of the clutch sleeve 27 should be preferably formed in a polygon having sides each in a form of the Archimedes' spiral, it will be appreciated that other various curved profiles may be made use of in place of the Archimedes' spiral to the substantially same effect.

As can be seen from FIG. 8, the outer periphery 28a of the brake sleeve 28 is also in a form of an equilateral polygon similar to that of the inner camming periphery 26a of the second turret assembly 26 with each side being profiled in a curve such as the Archimedes' spiral expressed by the formula $r = K\theta$ or the like. In this connection, it should be noted that the outer polygonal periphery 28a of the brake sleeve 28 is circumferentially displaced relative to the polygonal cam periphery 26a of the second turret assembly 26 (refer to FIG. 8), when the latter is in a position aligned with the outer polygonal periphery of the clutch sleeve 27 shown in FIG. 7. In the position shown in FIG. 8, the inner polygonal cam periphery of the second turret assembly 26 will press the brake sleeve 28 radially inwardly through the interposed needle rollers 31 of the third group, as the result of which the brake sleeve 28 is forcibly brought into a frictional close engagement with the second output shaft half 5a to thereby lock the second output shaft half 5b in the non-rotatable state. In this manner, when the second turret assembly 26 and the clutch sleeve 27 are in the position shown in FIG. 7 in which the first output shaft half 5a is rotatable relative to the second shaft half 5b, the latter is positively prevented from being rotated by means of the brake sleeve 28.

Figure 7A:
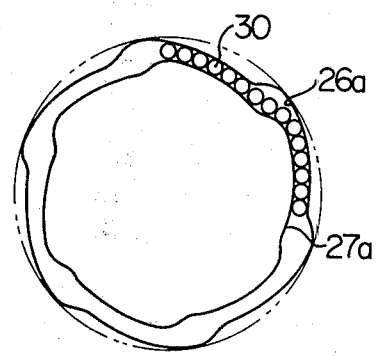
FIG. 7a is to illustrate schematically a positional relationship between an inner cam periphery of a second turret assembly and an outer peripheral surface of a clutch ring in a position at which the second turret assembly has been rotated for a predetermined angle from the position shown in FIG. 7.

On the other hand, when the second turret assembly 26 and the clutch sleeve 27 are brought to the position shown in FIG. 7a in dependence on the swing movement of the second turret assembly 26 at which position the first output shaft half 5a is rotatably coupled to the second output shaft half 5b, the polygonal cam periphery 26a of the second turret 26 is geometrically aligned with the outer polygonal periphery of the brake sleeve 28, resulting in that the pressing force applied radially inwardly to the brake sleeve 28 is removed, whereby the second output shaft half 5b is allowed to rotate within the brake sleeve 28. In this way, the first and second output shaft halves 5a and 5b are set to the position to be rotated together as an integral unit. In FIGS. 1 and 6, reference numeral 35 denotes a needle bearing for assuring a smooth rotation of the first shaft half 5a relative to the second shaft half 5b. Further, it will be self-explanatory that the first to third needle roller groups 29 and 31 serve also as the bearing for allowing smooth rotation of the output shaft halves 5a and 5b.

Now, description will be made on operations of the indexing drive apparatus of the structure described above.

When the input shaft 1 and the first cam assembly 2 are rotated continuously in a given direction, the first turret assembly 4 is caused to swing under the camming action of the cam assembly 2, resulting in the oscillatory rotation of the turret shaft 3 and hence the swinging movement of the first swing arm 9 fixedly secured to the turret shaft 3 (refer to FIGS. 3 and 4). The swinging movement of the first swing arm 9 is transmitted to the second swing arm 10 by way of the connecting rod 11, whereby the first shaft half 5a of the output shaft assembly 5 fixedly connected to the second swing arm 10 is caused to oscillate in rotation. Further, since the second cam assembly 25 of the clutch apparatus 24 is rotated together with the input shaft 1 thereby causing the second turret assembly 26 to perform a corresponding swinging movement, the second turret assembly 26 and the clutch sleeve 27 will take alternately the positions shown in FIGS. 7 and 7a, while the positional relationship between the second turret assembly 26 and the brake sleeve 28 is varied concurrently.

As described hereinbefore, at the position shown in FIG. 7a, the first output shaft half 5a is rotatable together with the second shaft half 5b. To the contrary, at the position shown in FIG. 7, the second shaft half 5b is held stationarily regardless of the rotation of the first shaft half 5a. Accordingly, when arrangement is previously made such that the clutch apparatus 24 takes the operating state illustrated in FIG. 7 upon oscillatory rotation of the first output shaft half 5a in one direction while taking the operating state illustrated in FIG. 7a upon oscillatory rotation of the first output shaft half 5a in the other direction, the second output shaft half 5b is caused to rotate intermittently only in the one direction. Such arrangement can be easily established by designing appropriately the geometrical or positional relationship between the first and the second cam assemblies 2 and 25.

In the indexing or intermittently drive apparatus described above, it is possible to change the ratio of the swing angle of the second swing arm to that of the first swing arm simply by displacing the slider member 7 (refer to FIGS. 3 and 4) in the first swing arm 9 along the axis 8. As can be seen from FIG. 4, the first swing arm 9 is adapted to swing about the center axis 14 of the turret shaft 3 which corresponds to the point O shown in FIG. 3. Consequently, when the slider memory 7 is displaced along the axis 8, the distance C between the above point O and a connecting point D (FIG. 3) of the first swing arm 9 and the connecting rod 11 will be correspondingly changed, whereby the angle $\theta$ between the axis 8 and the connecting rod 11 is changed correspondingly. Thus, the swing angle of the second swing arm 10 is changed for a predetermined angular displacement or swing of the first swing arm 9, involving a corresponding variation in the rotation angle of the first and the second output shaft halves 5a and 5b.

The sliding of the slider member 7 can be effected by rotating the crown gear 12 by the motor 16 through the spur gear 13 to move the screw rod 20 in the axial direction 8 of the first swing arm 9 through the paired gears 21 and 22, as described hereinbefore. Further, the crown gear 12 is also caused to swing due to the swinging rotation of the turret shaft 3 as brought about by the continuous rotation of the first cam assembly 2. In this connection, it should be noted that meshing engagement between the crown gear 12 and the spur gear 13 provides no obstacle to the swinging movement of the first swing arm 9 because the teeth of crown gear 12 are able to move smoothly relative to the teeth of the spur gear 13 in any swinging direction, as described hereinbefore. Of course, the displacement of the slider member 7 can be manually controlled by providing an appropriate handle instead of the motor 16.

In the case of the indexing drive apparatus described above, the output shaft 5 is constituted by the first shaft half 5a and the second shaft half 5b which are operatively connected to each other through the clutch apparatus 24 of the unique structure as described hereinbefore, whereby the second output shaft half 5b is intermittently rotated in one direction. However, it is of course possible to omit the second shaft half 5b and the clutch apparatus 24 and use the first shaft half 5a directly as the output shaft to produce an oscillatory rotation output.

Figure 10:
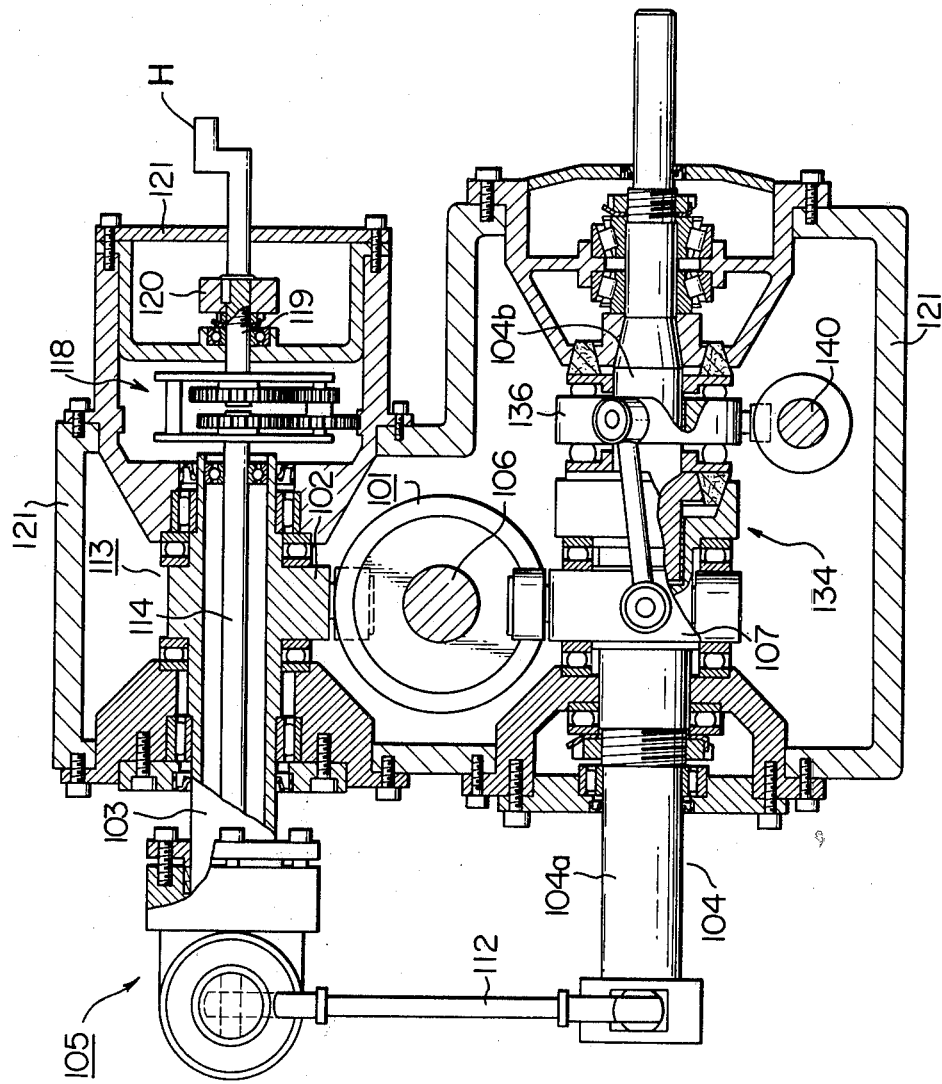
FIG. 10 is a longitudinal sectional view showing a general arrangement of an indexing drive apparatus according to a second embodiment of the invention.

Next, referring to FIGS. 10 to 16, description will be made of another exemplary embodiment of the indexing drive apparatus according to the invention. As is shown in FIG. 10, the indexing drive apparatus comprises in general a composite cam assembly 101 connected to a drive source such as an electric motor (not shown) through an input shaft 101, a cam follower turret 102, a turret shaft 103 on which the cam follower turret 102 is fixedly mounted, an output shaft 104 which extends substantially in parallel to the turret shaft 103 and an interlocking unit 105 for operatively connecting the turret shaft 103 to the output shaft 104. As can be seen from FIG. 11, the cam follower turret 102 has a pair of cam follower rolls 102' which are disposed in opposition to each other so as to engage with the respective camming surfaces 101a of the composite cam assembly 101. Thus, when the composite cam assembly 101 is rotated continuously in a direction, the turret 102 is forcibly caused to swing as indicated by an arrow A in dependence on the profile imparted to the camming surfaces 101a. It should be mentioned here that the apparatus for converting rotation into a swing or oscillatory rotational movement by using a composite cam member and a turret has been hitherto known by itself. In the case of the indexing drive apparatus being described now, a globoidal cam is employed for the composite cam assembly 101 with a view to assuring a high rigidity and operation accuracy. As will be described hereinafter, the composite cam assembly 101 is adapted to drive other cam follower turret 107.

Figure 13:
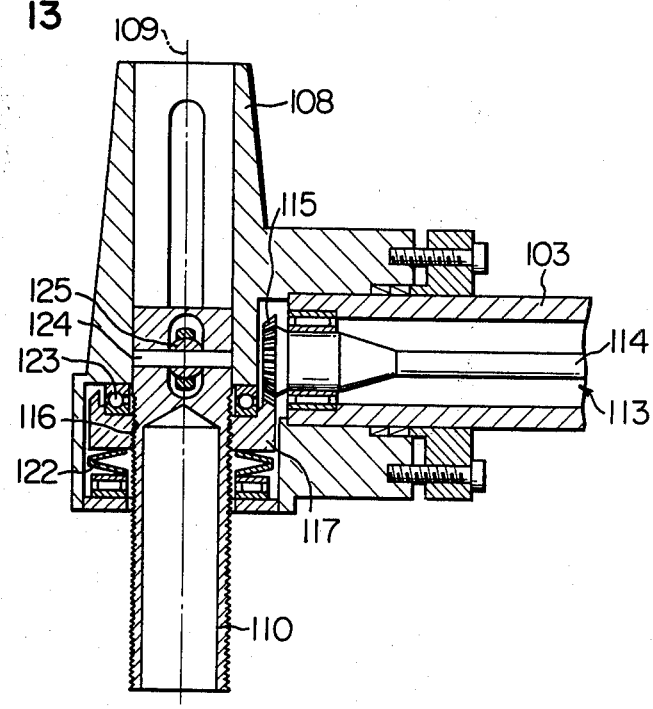
FIG. 13 is a sectional view to illustrate an arrangement for controllably adjusting operation of the interlocking apparatus shown in FIG. 12.

Referring to FIGS. 10, 12 and 14 in particular, the interlocking or coupling unit 105 includes a first swing member 108 fixedly secured to the turret shaft 103, a slider member 110 movable along the axis 109 of the first swing member 108, a second swing member 111 fixedly secured to the output shaft 104 at one end thereof, a connecting rod 112 for pivotally connecting the other end of the second swing member 111 to the slider member 110, and an adjusting means 113 for adjusting or regulating the displacement of the slider member 110 in the axial direction 109. In the indexing drive apparatus now being described, the adjusting means 113 comprises an adjusting rod 114 extending through the interior of the turret shaft 103 which is implemented as a hollow shaft, a driving bevel gear 115 fixedly secured to the adjusting rod 114 at a left end thereof as viewed in FIGS. 10 and 13, and a driven bevel gear 117 threadedly mounted (at 116) on the slider member 110. The other end (right end as viewed in FIGS. 10 and 13) of the adjusting rod 114 is operatively coupled to a handle H located exteriorly of the machine housing 121 through a planetary gear train 110, a shaft 119 and a pulley 120. The driven bevel gear 117 is urged to bear on a bearing 123 under a biasing force of a spring 122 and thus inhibited from spontaneous movement in the axial direction 109. When the adjusting rod 114 is rotated by means of the handle H through the pulley 120, shaft 119 and the planetary gear train 110, the driven bevel gear 117 is correspondingly rotated around the slider member 110 through the driving bevel gear 115, resulting in a corresponding displacement of the slider member 110 in the axial direction. In FIG. 13, reference numerals 124 and 125 denote a mounting pin and a bearing rotatably mounted thereon. By means of the pin 124 and bearing 125, the connecting rod 112 is pivotally connected at one end thereof to the slider member 110. The connection between the other end of the connecting rod 112 and the second swing member 111 is realized in the similar manner (refer to FIG. 12).

Figure 14A:
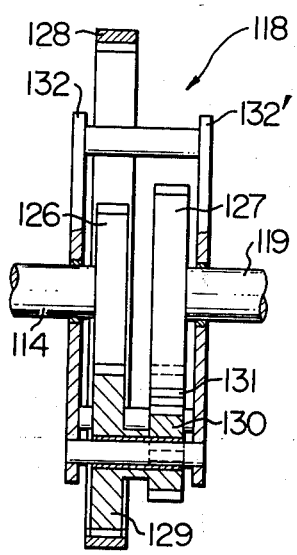
FIG. 14a is a partial sectional view showing a planetary gear train incorporated in the indexing drive apparatus shown in FIG. 10.
Figure 14B:
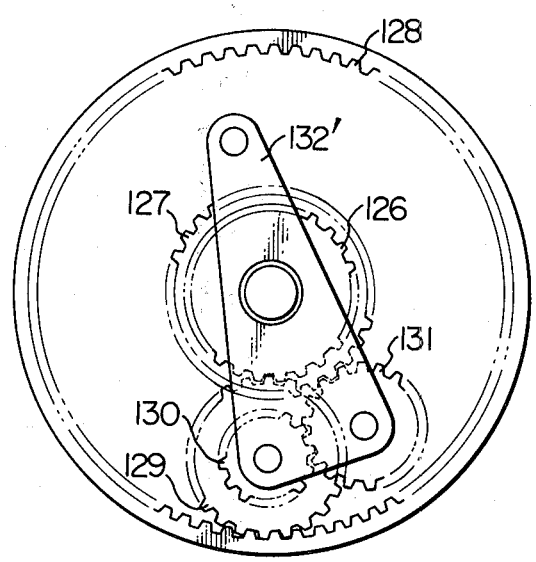
FIG. 14b is a side view of the planetary gear train.

FIGS. 14a and 14b show in detail a structure of the planetary gear train 118. As will be seen from these figures, the planetary gear train 118 includes first and second sun gears 126 ad 127 which are fixedly secured to the adjusting rod 114 and the shaft 119, respectively, a first planetary gear 129 adapted to mesh with the first sun gear 126 and an internal gear 128, a second planetary gear 130 and a third planetary gear 131 which meshes with the second sun gear 127. These gears 126 and 131 are assembled together by using a pair of mounting plates 132 and 132' to thereby constitute, the planetary gear train 118. With the arrangement of the gears described above, when the adjusting rod 114 and the first sun gear 126 fixedly secured thereto is rotated, the planetary gears 129 to 131 are rotated idly, whereby the second sun gear 127 remains stationary. On the other hand, when the adjusting handle H is operated to rotate the shaft 119 and the second sun gear 127 fixedly secured thereto, the first sun gear 126 and hence the adjusting rod 114 is rotated through cooperation of the planetary gears 131, 130 and 129. It should be mentioned that the planetary gear train of the transmission characteristic described above can be easily implemented by selecting appropriately the number of teeth to be formed in the individual planetary gears 126 and 131.

Figure 15A:
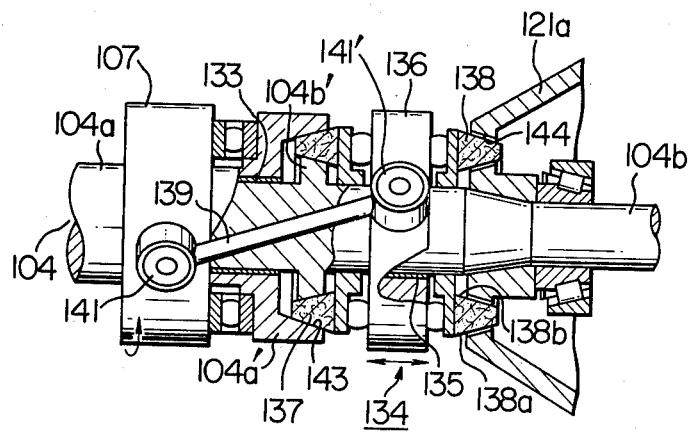
FIG. 15a shows in a partially sectional view a structure of clutch incorporated in the indexing drive apparatus shown in FIG. 10 in one operating position.
Figure 15B:
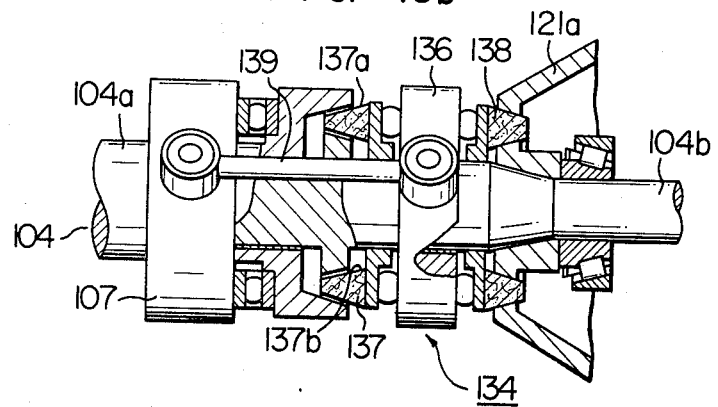
FIG. 15b is a similar view to FIG. 15a and showing the clutch in other operating position.
Figure 16A:
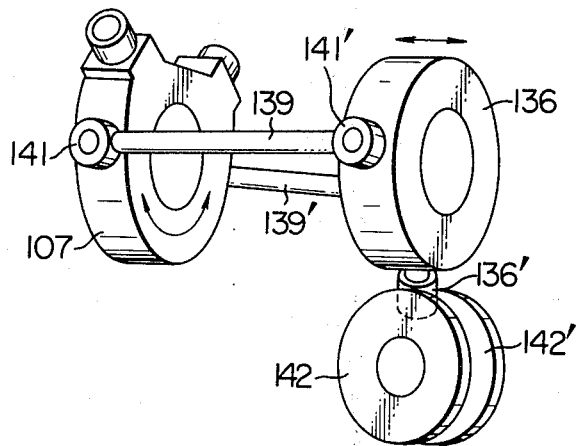
FIG. 16a illustrates a shift member for controlling the operation of the clutch in combination with the second cam follower turret in one operating position.
Figure 16B:
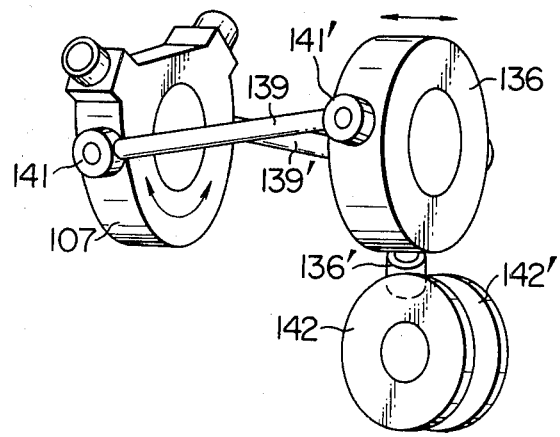
FIG. 16b is a view similar to FIG. 16a and shows the same in other operating position.

Referring again to FIG. 10 in combination with FIGS. 15a and 15b, the output shaft 104 is composed of a first shaft portion 104a, and a second shaft portion 104b rotatably coupled to the first shaft portion 104a through a metal bush 133. A clutch apparatus 134 is provided for disconnectably coupling the first and the second shaft portions 104a and 104b to each other and composed of a second cam follower turret 107 having a pair of cam follower rolls 107' adapted to engage cam surfaces 101b of the composite cam assembly 101 (FIG. 11), a ring-like shift member 136 slidably mounted on the second output shaft portion 104b through an interposed metal bush 135 and pivotally connected to the second turret 107 through a pair of rods 139 and 139' (FIGS. 15 and 14), and a frictional clutch ring 137 and a frictional brake ring 138 which are slidably disposed on the second output shaft portion 104b adjacent to the lateral side faces of the ring-like shift member 136. A cam follower 136' is formed in the shift member and projects downwardly to engage with a pair of control plates 142 and 142' which are mounted on a stationary shaft 140 (FIG. 10), as is illustrated in FIGS. 16a and 16b. With such arrangement, when the turret 107 is swung, the shift member 136 is prevented from being rotated because the cam follower 136' is engaged with the control plates 142 and 142'. In this condition, the shift member 136 is caused to move reciprocally on the second output shaft portion 104b in the axial direction thereof as indicated by a double-headed arrow in FIGS. 16a and 16b. In FIGS. 15, 16a and 16b, reference numerals 141 and 141' denote ball joints provided, respectively, at the second turret 107 and the shift member 136 for pivotally connecting the rod 139. Similar ball joints may be used for connecting the rod 139' to the turret 107 and to the shift member 136.

As is shown in FIG. 15, the outer peripheral surfaces 137a and 138a of the frictional clutch ring 137 and the frictional brake ring 138 are slanted such that the outer diameter of these rings 137 and 138 is reduced as the distance to the shift member 136 is increased as viewed in the axial direction. On the contrary the inner peripheral surfaces 137b and 138b of these rings 137 and 138 are slanted in the reverse manner. The frictional clutch ring 137 is disposed within an annular gap 143 which is defined between an annular extension 104a' of an enlarged diameter formed integrally with the first shaft portion 104a and a flange-like collar 104b' and is of a cross-sectional form complementary to that of the clutch ring 137. On the other hand, the frictional brake ring 138 is disposed within an annular groove 144 which is formed in a housing wall portion 121a enclosing the second shaft portion 104b and has a profile complementary to that of the brake ring 138. It will be noted that both of the rings 137 and 138 are mounted on the second shaft portion 104b to be movable together with the shift member 136 between a lefthand position (i.e. the position shown in FIG. 15a) and a righthand position (i.e. the position shown in FIG. 15b). In the lefthand position, the clutch ring 137 is tightly engaged in the annular gap 143 while the brake ring 138 is loosely accommodated within the annular groove 144 without any frictional engagement, whereby the first shaft portion 104a is coupled to the second shaft portion 104b through the clutch ring 137 so as to be rotatable together. In the righthand position defined above, the clutch ring 137 is loosely positioned within the annular gap 143 while the brake ring 138 is caused to tightly engage in the annular groove 144, as the result of which the second shaft portion 104b is locked to be non-rotatable by means of the brake ring 138 with the first shaft portion 104a being operatively disconnected from the second shaft portion 104b. Thus, only the first shaft portion 104a is rotatable in the righthand position.

Now, operation of the indexing drive apparatus according to the second embodiment of the invention will be described.

When the input shaft 106 and hence the composite cam assembly 101 fixedly secured thereto are rotated continuously by a drive source (not shown), the turret shaft 103 is rotated in an oscillating manner, whereby the first swing member 108 secured to the turret shaft 103 is correspondingly swung (refer to FIGS. 10, 12 and 13). The swinging movement of the first swing member 108 is transmitted to the second swing member 111 through the connecting rod 112, causing an oscillatory rotation of the first shaft portion 104a of the output shaft 104. Concurrently, the turret 107 of the clutch apparatus 134 (refer to FIGS. 10, 15 and 16) is caused to swing following the rotation of the composite cam assembly 101. In dependence on the swinging directions of the turret 107, the shift member 136, the clutch ring 137 and the brake ring 138 are moved reciprocally between the lefthand position shown in FIG. 15a and the righthand position shown in FIG. 15b.

Figure 11:
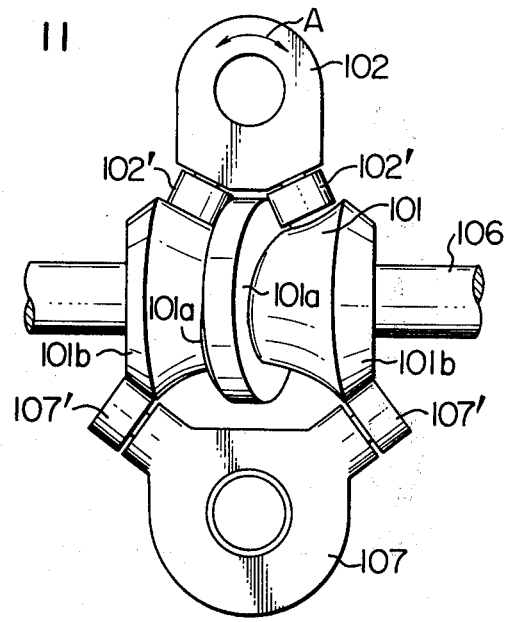
FIG. 11 illustrates schematically positional relationships between a composite or globoidal cam assembly and two turrets incorporated in the indexing drive apparatus shown in FIG. 10.

In the lefthand position shown in FIG. 15a, the second shaft portion 104b is rotated together with the first shaft portion 104a, while the righthand position shown in FIG. 15b only the first shaft portion 104a is allowed to rotate with the second shaft portion 104b being held stationary under the braking action of the frictional brake ring 138, as described hereinbefore. Accordingly, by arranging previously such that the clutch apparatus 134 is always in the righthand position shown in FIG. 15b when the first shaft portion 104a is rotated in a predetermined direction while the clutch apparatus 134 takes the position shown in FIG. 15a upon rotation of the first shaft portion 104a in the other direction, it is possible to rotate the second output shaft portion 104b intermittently in the predetermined direction. The above arrangement can be easily established by selecting appropriately geometrical factors of the camming surfaces 101a and 101b of the composite cam assembly 101 (FIG. 11).

In the indexing drive apparatus according to the second embodiment of the invention, it is also possible to vary the ratio of the swing angle of the second swing member 111 to that of the first swing member 108 by merely moving the slider member 110 upwardly or downwardly relative to the first swing member 108. More particularly, the first swing member 108 swings about a center defined by the center axis of the turret shaft 103 and the adjusting rod 114. The swing center is shown at O in FIG. 12. When the slider member 110 is vertically moved, distance C between the point O and a connecting point B of the first swing member 110 and the connecting rod 112 is varied, whereby an angle $\theta$ between the connecting rod 112 and the horizontal is correspondingly changed. Refer to FIG. 12. Thus, the swing angle of the second swing member 111 is varied for the constant swinging movement of the first swing member 108 over a preset angular range, resulting in a corresponding variation in the magnitude of the intermittent rotation of the second output shaft portion 104b.

The vertical displacement of the slider member 110 is controlled by means of a handle H provided exteriorly of the machine housing 121 which is coupled to a shaft 119 (FIGS. 10 and 14). More particularly, when the H is rotated, the adjusting rod 114 and the paired bevel gears 115 and 117 are correspondingly rotated to move the slider member 110 relative to the first swing member 108, as described hereinbefore in conjunction with FIGS. 10, 13 and 14. In this connection, it should be mentioned that although the oscillatory rotation of the turret shaft 103 brings about the simultaneous rotation of the adjusting rod 114, the shaft 119 remains stationary, whereby the control H is maintained stationary regardless of the rotation of the adjusting rod 114. This arrangement is advantageous in that no deviation will occur in any set position of the H.

As will be appreciated from the foregoing description, the indexing drive apparatus according to the illustrated embodiments of the invention are constructed so that either an oscillatory rotation output or an intermittent rotation in one direction can be derived from the output shaft. The indexing drive apparatus is thus suited to drive turntable of various automatic manufacturing machines for indexing the work turntable at variable processing positions. By virtue of the arrangement such that the angular displacement of the output shaft for every intermittent rotation thereof can be varied in a stepless manner merely by moving the movable member (7;110) of the interlocking unit (6;110), the indexing drive apparatus can be advantageously employed as a drive source for an automatic machine tool or manufacturing machine which is adapted to work or manufacture products of various types. For example, when the indexing drive apparatus is applied to a blank steel sheet feeding apparatus for unwinding a steel sheet band from a sheet coil and feeding intermittently it is one direction to a working station, it is possible to vary the feeding quantity or length of the steel sheet by correspondingly changing the magnitude of the intermittent rotation of the output shaft. Thus blank sheets of variable lengths demanded by various products to be manufactured can be supplied to the working station in a facilitated manner.

Further, by virtue of the arrangement of the swing angle adjusting mechanisms described hereinbefore, the controllable variation of the intermittent rotation angle of the output shaft can be effected without involving interruption in the operation of the indexing drive apparatus.

Due to the use of the cam assembly in combination with the respective turret or cam follower assemblies, backlash in operation can be positively suppressed, whereby a high operation reliability as well as accuracy can be assured. Besides, the clutch apparatus of the unique structure as described hereinbefore enhances further the accuracy and reliability in operation of the indexing drive apparatus.

What is claimed is:

1. An indexing drive apparatus comprising a composite cam assembly connected to a drive source to be rotated, a turret assembly adapted to follow rotation of said composite cam assembly thereby to be swung, a turret shaft having said turret assembly fixedly mounted thereon and adapted to be rotated in an oscillatory manner in correspondence to the swinging movement of said turret assembly, an output shaft extending substantially in parallel with said turret shaft, and an interlocking unit for operatively connecting said turret shaft and said output shaft to each other, said interlocking unit including a first swing member fixedly secured to said turret shaft at one end thereof, a movable member mounted on said first swing member to be swung together with said first swing member and adapted to be movable relative to said first swing member in the axial direction thereof, a second swing member fixedly secured to said output shaft at one end thereof, a connecting member for linking the other end of said second swing member to said movable member, and adjusting means operatively connected to said movable member for varying the ratio of a swing angle of said second swing member to a swing angle of said first swing member by adjusting the position of said movable member relative to said first swing member in the axial direction thereof.

2. An indexing drive apparatus according to claim 1 wherein said turret shaft is constituted by a hollow shaft, said adjusting means includes an adjusting rod extending through said hollow turret shaft and operatively connected to said movable member through a pair of bevel gears which are composed of a driving gear fixedly secured to one end of said adjusting rod and a driven bevel gear mounted in said first swing member unmovably in the axial direction thereof and threadedly engaging with said movable member at an intermediate portion thereof, and wherein said adjusting rod, said paired bevel gears, said movable member and said first swing member are adapted to be swung as an integral unit simultaneously with the oscillatory rotation of said turret shaft, wherein rotation of said adjusting rod relative to said turret shaft is converted to a displacement of said movable member in the axial direction of said first swing member.

3. An indexing drive apparatus according to claim 2, wherein the other end of said adjusting rod is connected to a rotatable manipulator handle through a planetary gear train which comprises a first sun gear fixedly secured to said other end of said adjusting rod, a second sun gear fixedly secured to a shaft connected to said manipulator handle and a plurality of planetary gears disposed between said first and second sun gears in such a manner that rotation of said second sun gear results in rotation of said first sun gear, while rotation of said first sun gear involves no rotation of said second sun gear.

4. An indexing drive apparatus according to claim 1, wherein said output shaft is constituted by a first shaft portion fixedly secured to said second swing member and a second shaft portion provided in alignment with said first shaft portion so as to be rotatable relative to said first shaft portion, further comprising clutch means operative to disconnectably connect said first and second shaft portions to each other, wherein said clutch means including a second turret assembly mounted rotatably on said first shaft portion and adapted to follow rotation of said composite cam assembly thereby to be swung, whereby connection and disconnection of said first and second shaft portions is controlled through swinging movement of said second turret assembly.

5. An indexing drive apparatus according to claim 4, wherein said clutch means further includes a shift member disposed on said second shaft portion and operatively connected to said second turret assembly, a frictional clutch ring and a frictional brake ring disposed on said second shaft member adjacent to one and other sides of said shift member in opposition to each other, an annular extension formed in said first shaft portion so as to enclose the adjacent end portion of said second shaft portion, an annular gap provided adjacent to said frictional clutch ring and defined between an inner surface of said annular extension and an outer surface of said second shaft portion, and an annular aperture formed in a housing wall surrounding said second shaft portion at a location adjacent to said frictional brake ring, said second shaft portion being rotatable relative to said shaft member which in turn is so arranged to be reciprocally movable in the axial direction of said second shaft portion in response to the swinging movement of said second turret assembly, both of said frictional clutch ring and said frictional brake ring being disposed on said second shaft portion to be reciprocally movable together with said shift member and each having slanted outer and inner peripheral surfaces converging in the direction opposite to said shift member, said annular gap and said annular aperture being of profiles complementary to those of said clutch ring and said brake ring, respectively, whereby when said clutch ring is frictionally engaged in said annular gap in response to the movement of said shift member in one axial direction, said brake ring is disengaged from said annular aperture, while said brake ring is frictionally engaged in said annular aperture when said clutch ring is disengaged from said annular gap in response to the movement of said shift member in the other axial direction.

6. An indexing drive apparatus comprising a cam assembly connected to a drive source to be rotated, a turret assembly fixedly mounted on a turret shaft and adapted to follow rotation of said cam assembly thereby to be swung an output shaft extending substantially in parallel with said turret shaft, and an interlocking unit for operatively connecting said turret shaft and said output shaft to each other, said interlocking unit including a first swing arm fixedly secured at one end thereof to said turret shaft and extending substantially perpendicularly to said turret shaft, a slider member contained in said first swing arm to be slidably moved in the axial direction of said first swing arm, a second swing arm fixedly secured at one end thereof to said output shaft and extending substantially in parallel with said first swing arm, a connecting rod for connecting pivotally the other end of said second swing arm to said slider member, a crown gear mounted on said first swing arm so as to be swingable together with said first swing arm and additionally rotatable about an axis substantially parallel to the longitudinal axis of said first swing arm, said crown gear being operatively connected to said slider member so that said slider member is slidably displaced relative to said first arm upon rotation of said crown gear, and a spur gear adapted to mesh with said crown gear, wherein teeth of said crown gear and said spur gear are so dimensioned that rotation of said crown gear brings about the rotation of said crown gear while upon swinging movement of said crown gear together with said first arm, said crown gear is displaced relative to said spur gear in the swinging directions.

7. An indexing drive apparatus according to claim 6, wherein said crown gear is rotatable about a rotation axis extending in the direction orthogonal to the axis of said turret shaft and the axis of said first swing arm, and said crown gear is provided with a plurality of arcuate teeth formed on a spherical surface having a center at intersection of said rotation axis and the axis of said turret shaft and extending in the direction coinciding with said rotation axis, while a rotation axis and teeth of said spur gear extend substantially in parallel with said rotation axis of said crown gear.

8. An indexing drive apparatus comprising a cam assembly connected to a drive source to be rotated, a first turret assembly fixedly mounted on a turret shaft and adapted to swing, an output shaft having a first shaft portion and a second shaft portion and extending substantially in parallel with said first turret shaft, an interlocking unit for operatively connecting said first turret shaft and said first shaft portion, and clutch means for disconnectably coupling said first and second shaft portions of said output shaft to each other, said interlocking unit including a first swing arm fixedly secured at one end thereof to said turret shaft and extending substantially perpendicularly to said turret shaft, a slider member contained in said first swing arm to be slidably moved in the axial direction of said first swing arm, a second swing arm fixedly secured at one end thereof to said first shaft portion of said output shaft and extending substantially in parallel with said first swing arm, a connecting rod for connecting pivotally the other end of said second swing arm to said slider member, a crown gear mounted on said first swing arm to be swingable together with said first swing arm and additionally rotatable about a rotation axis orthogonal to the axis of said turret shaft in a plane containing the axis of said first swing arm and the axis of said turret shaft, and a spur gear meshed with said crown gear, said crown gear being operatively connected to said slider member so that said slider member is slidably displaced relative to said first arm upon rotation of said crown gear, said crown gear being provided with a plurality of arcuate teeth formed on a spherical surface having a center at the intersection of said rotation axis and the axis of said turret shaft and extending in the direction coinciding with said rotation axis so that upon swinging movement of said crown gear said arcuate teeth of said crown gear are slidable relative to the teeth of said spur gear along the arcuate direction, said clutch means including a second cam assembly mounted on said input shaft, and a second turret assembly provided at coupling portion between said first and second output shaft portions and adapted to follow the rotation of said second cam assembly to be correspondingly swung, thereby to control connection and disconnection between said first shaft portion and said second shaft portion.

9. An indexing drive apparatus according to claim 8, wherein said first shaft portion has an inner end portion rotatably inserted within a sleeve like portion formed in an adjacent inner end portion of said second output shaft portion, said clutch means including a second turret positioned to enclose said sleeve portion, a clutch sleeve fixedly secured at one end thereof to a housing of said indexing drive apparatus and disposed between said sleeve portion and said second turret so as to define first and second annular gaps between said clutch sleeve and said sleeve portion of said second shaft portion and between said clutch sleeve and said second turret, respectively, and first and second groups of needle rollers accommodated within said first and second annular gaps, respectively, wherein the inner peripheral surface of said second turret and the outer peripheral surface of said clutch sleeve are formed in cross-section in similar equilateral polygons, each side of which is profiled in a form of an Archimedes' spiral, whereby upon displacement of said second turret to a position where said polygons are deviated from circumferential mutual alignment, said inner peripheral surface of said second turret presses said clutch sleeve radially inwardly through said second group of needle rollers thereby to press said sleeve portion radially inwardly to said first shaft portion through said second group of needles rollers to cause said sleeve portion to frictionally engage with said first shaft portion for simultaneous rotation.

10. An indexing drive apparatus according to claim 9, wherein said clutch means further includes a brake sleeve having an end fixedly secured to said housing and disposed around said second shaft portion adjacent to said clutch sleeve, and a third group of needle rollers, said inner peripheral surface of said second turret extending to a position to enclose said brake sleeve to define a third annular gap with said brake sleeve, said third group of needle rollers being closely accommodated within said third annular gap, said brake sleeve having an outer peripheral surface in a form of an equilateral polygon in cross-section similar to that of said inner peripheral surface of said second turret, said polygon having sides each in a form of an Archimedes' spiral and being deviated from the aligned position with the polygon of said clutch sleeve so that when said first shaft portion is operatively disconnected from said sleeve portion in dependence on the swinging movement of said second turret, the inner polygonal peripheral surface of said second turret is positioned out of alignment with the outer polygonal peripheral surface of said brake sleeve, whereby said brake sleeve is radially inwardly pressed by the inner peripheral surface of said second turret through said third group of needle rollers to lock said second shaft portion non-rotatably.

\* \* \* \* \*